US011526349B1

(12) United States Patent
Russell et al.

(10) Patent No.: US 11,526,349 B1
(45) Date of Patent: Dec. 13, 2022

(54) ASSET MANAGEMENT TRACKING THROUGH SOURCE CODE

(71) Applicant: United Services Automobile Association (USAA), San Antonio, TX (US)

(72) Inventors: Ryan Thomas Russell, San Antonio, TX (US); Jason Brett Morris, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 28 days.

(21) Appl. No.: 17/082,978

(22) Filed: Oct. 28, 2020

Related U.S. Application Data

(60) Provisional application No. 62/928,123, filed on Oct. 30, 2019.

(51) Int. Cl.
*G06F 8/70* (2018.01)
*G06F 3/048* (2013.01)
*G06F 3/04817* (2022.01)

(52) U.S. Cl.
CPC ............ *G06F 8/70* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 9,569,341 B1* | 2/2017 | van Schaik | G06F 11/3688 |
| 2008/0295069 A1* | 11/2008 | Nicholls | G06F 8/76 717/106 |
| 2013/0145343 A1* | 6/2013 | Warren | G06F 8/30 717/101 |
| 2014/0068591 A1* | 3/2014 | Harding | G06F 8/65 717/171 |
| 2015/0268941 A1* | 9/2015 | Nakaike | G06F 8/4443 717/152 |
| 2016/0321036 A1* | 11/2016 | Schnepper | G06F 8/61 |
| 2017/0123963 A1* | 5/2017 | Koren | G06F 11/3688 |
| 2021/0055920 A1* | 2/2021 | Baughman | G06F 30/20 |
| 2022/0083450 A1* | 3/2022 | Geddes | G06F 11/3624 |

* cited by examiner

*Primary Examiner* — Philip Wang
(74) *Attorney, Agent, or Firm* — Fletcher Yoder, PC (57) ABSTRACT

A resource tracking system includes a resource storage device with multiple resources and a resource tracking application. The resource tracking application scans the resource storage device to identify the resources, determines a deployment date, an execution date, or both for each resource, identifies a subset of the resources that do not meet deployment date criteria, execution date criteria, or both based upon the deployment date, the execution date, or both determined for each resource, and recommends an action to delete the subset of the plurality of resources via a graphical user interface.

9 Claims, 6 Drawing Sheets

ASSET MANAGEMENT TRACKING THROUGH SOURCE CODE

CROSS-REFERENCE TO RELATED APPLICATION

The present disclosure is related to, and claims priority to, U.S. Provisional Patent Application Ser. No. 62/928,123, entitled "Asset Management Tracking Through Source Code," which was filed on Oct. 30, 2019, and which is herein incorporated by reference in its entirety for all purposes.

BACKGROUND

The field of the disclosure relates generally to asset management tracking and, more particularly, to tracking assets on a server through source code.

Many enterprises have a significant number of assets and resources, such as servers, software, applications, source code, etc., that build up over time through the life of the enterprise. As technology and innovation change, these resources are updated and added to during the development and deployment of new software, programs, server rules, etc. Over time, some of these resources may become outdated and, therefore, are no longer used by various other scripts and programs. Unfortunately, however, the unused resources are oftentimes not decommissioned, which may cause many inefficiencies within the Information Technology (IT) environment. For example, systems may become less efficient as processing power is dedicated to supporting these outdated and unused resources. Further, as unused code is oftentimes not maintained, security vulnerabilities may oftentimes be introduced with this unused code.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a resource tracking system includes a resource storage device with multiple resources and a resource tracking application. As used herein, the resource tracking application may refer to an application or service running on computer hardware. The resource tracking application scans the resource storage device to identify the resources, determines a deployment date, an execution date, or both for each resource, identifies a subset of the resources that do not meet deployment date criteria, execution date criteria, or both based upon the deployment date, the execution date, or both determined for each resource, and recommends an action to delete the subset of the plurality of resources via a graphical user interface.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. The terms "optional" or "optionally" mean that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In general, the present disclosure relates to scanning for and facilitating decommissioning of unused resources in an IT environment. In particular, a scanner may scan for deployment dates and/or last execution dates to identify unused resources. These unused resources may be identified for removal or may be automatically removed.

Figure 1:
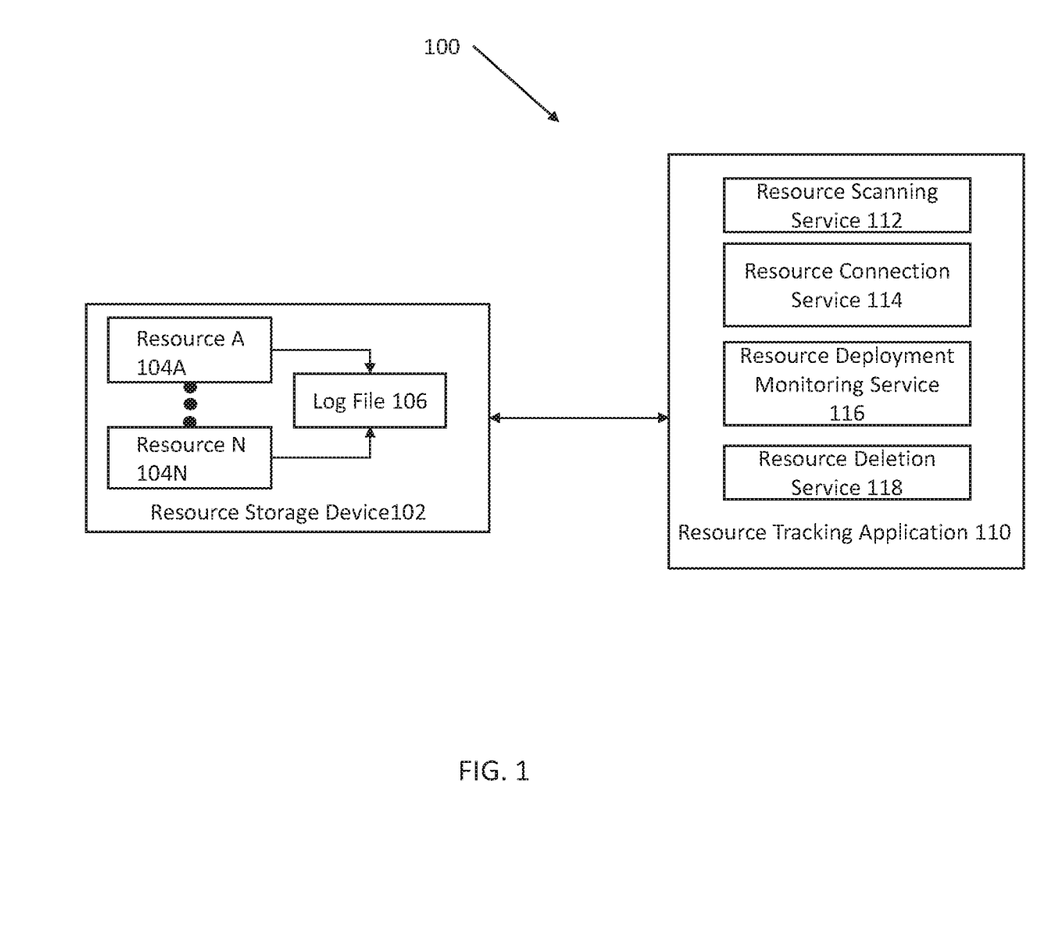
FIG. 1 depicts a system block diagram for a resource tracking system, in accordance with aspects of the present disclosure.

With the preceding context in mind, FIG. 1 is a block diagram for resource tracking system 100 as discussed herein. The resource tracking system 100 may include a resource storage device 102 and a resource tracking application 110. The resource tracking system 100 may be communicatively coupled to a variety of data sources that may assist the resource tracking system 100 in performing the functions of the embodiments described herein. Each of these components are described below.

The resource tracking system 100 may include a resource storage device 102. The resource storage device 102 may be any suitable computing device, such as a general or special-purpose personal computer, a laptop computer, a tablet computer, a mobile computer, a server, and the like that is configured in accordance with present embodiments. The resource storage device 102 may include various types of components that may assist the resource storage device 102 in performing various types of computer tasks and operations. For example, the resource storage device 102 may include a processor, one or more databases, and a communication device. In addition, the resource storage device 102 may also include a memory, a display, input/output (I/O) ports, and the like.

The resource storage device 102 may include various resources 104A through 104N located on a database or suitable articles of manufacture or digital or virtual constructs that can serve as media or platforms to store files, data, or the like. Such databases may include or be based on computer-readable media (e.g., any suitable form of memory or storage) that may store the data and files used by resource storage device 102 to perform the presently disclosed techniques. It should be noted that non-transitory merely indicates that the media is tangible and not a signal. The resources 104 may be any type of application, source code, software or any other computer-related data that may be stored on the resource storage device 102. In one or more embodiments, some resources 104 may depend upon other resources 104 stored on the resource storage device 102 or even resources stored on a separate resource storage device. For example, one resource 104A may be source code designed to run a script using input from another resource 104N which is another piece of source code.

The resource storage device 102 may also include a log file 106 located on a database or suitable articles of manufacture or digital or virtual constructs that can serve as media or platforms to store files, data, or the like. The log file 106 may be a file that contains information related to the resources 104 such as a deployment date, a history of execution dates, a size of the resources, and any other information pertinent to the resources 104. A user may access the resource tracking system 100 remotely to view the log file 106. For example, a user on a computer separate from the resource storage device 102 may access the log file 106 to view the deployment date of a particular resource 104. In some embodiments, the log file 106 may not be used, instead relying on metadata of the resources 104 to identify the deployment date, history of execution dates, size of the resources, etc.

Returning to the resource tracking system 100, a resource tracking application 110 may be utilized by the resource tracking system 100. The resource tracking application 110 may be any type of application that tracks resources 104 stored on a computer, such as the resource storage device 102. The resource tracking application 110 may be located on any type of computer device such as general or special-purpose personal computer, a laptop computer, a tablet computer, a mobile computer, a server, and the like that is configured in accordance with present embodiments. In one or more embodiments, the resource tracking application 110 may be located on the resource storage device 102. The resource tracking application 110 may be a type of computer application/service that scans and reads through all available resources 104 on a resource storage device 102. In other words, the resource tracking application 110 may have capability to read the contents of the resource 104, such as lines of source code. For example, the resource tracking application 110 may perform static program analysis, which analyzes source code to identify attributes of the associated resources. One example of static program analysis is static application security testing (SAST) software. SAST software may generate entries in a log by analyzing the history of the source code in the resource storage device 102. For example, version control systems (e.g., Git) may provide version control histories/versioning, which may be identified and logged in the log file 106. The scanner may look at server, configuration items (CI), or Security Information and Event Management (STEM) logs to identify the relevant information regarding the sources. Thus, the SAST software may determine the deployment date of the source code, how many times the source code has been executed, and the date of the most recent execution of the source code.

The resource tracking application 110 may include a resource scanning service 112. The resource scanning service 112 may include functionality to scan the resource storage device 102 to find any resources 104. The resource scanning service 112 may scan through all resources 104 located on the resource storage device 102 or narrow down the scanning based on the file type (e.g., .exe, .doc, .txt, etc.). For example, the resource scanning service 112 may only be tasked to scan for source code files ending in .exe. During the scanning process, the resource scanning service 112 may identify all resources stored on the resource storage device 102.

The resource tracking application 110 may also include a resource connection service 114. The resource connection service 114 may make a determination regarding which resources 104 within the resource storage device 102 are dependent upon each other. The scope of the resource connection service 114 may not be limited to the resource storage device. In one or more embodiments, the resource connection service 114 may find dependencies of resources 104 across multiple servers or computer hardware. The resource connection service 114 may read through/parse the resources 104 to determine if other resources are referenced within the resource 104. If references to other resources 104 are found, then a dependency on the referenced resource 104 exists. For example, the resource tracking application 110 may read through lines of a source could on a server and determine that the source code calls out functionality to another piece of source code located on a separate server. Therefore, a dependency on the other piece of source code exists with regard to the analyzed source code. Further, if any other resources reference a candidate resource for removal/update, then the referencing resources have a dependency on the candidate resource.

The resource tracking application 110 may include a resource deployment monitoring service 116. The resource deployment monitoring service 116 may have capability to scan and read a log file 106 that contains information about a particular resource 104. In one or more embodiments, the resource deployment monitoring service 116 may scan and read the log file 106 to determine when the resource 104 was deployed or when the resource 104 was last executed. In one or more embodiments, the resource deployment monitoring service 116 may scan the resource 104 for information related to deployment and execution of the resource. For example, the resource deployment monitoring service 116 scan the log file containing information of a particular resource to determine that the resource was deployed on the server in August 2017 and last executed on September 2019.

The resource tracking application 110 may also include a resource deletion service 118. The resource deletion service 118 may make a recommendation to a user to delete a resource 104 based on a deployment date, an execution date, or a combination of the two dates. In one or more embodiments, the resource deletion service 118 may use a combination of other factors to make a recommendation for deleting a resource 104 such as dependencies upon other resources or resources depending upon the resource 104. The recommendation may be displayed to the user via a user interface, a graphical user interface, a prompt, a text, email, or any other method. In some embodiments, the resource deletion service 118 may go further than a recommendation and automatically delete the identified resources 104.

Figure 2:
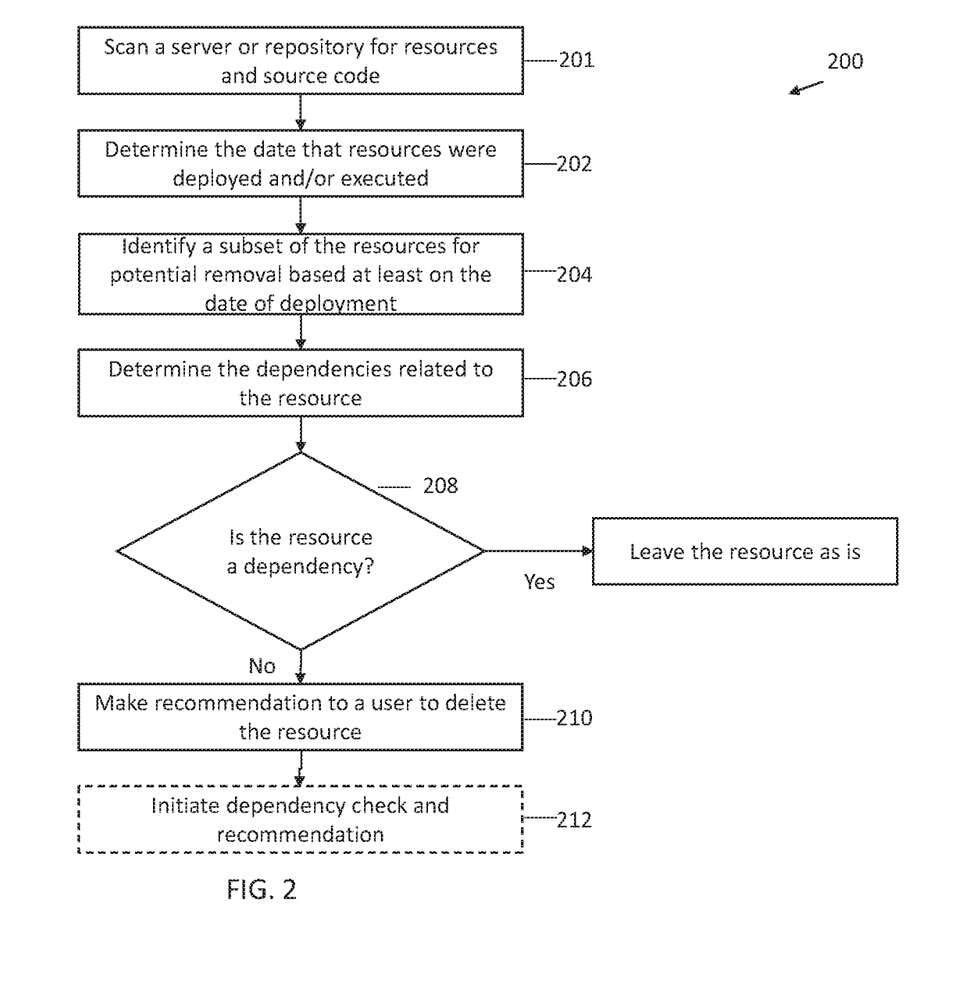
FIG. 2 shows a flowchart for scanning resources, in accordance with aspects of the present disclosure.

Turning now to FIG. 2, a process 200 for making a recommendation to a user to delete a resource is shown. The steps presented in FIG. 2 may be performed in any order, and some steps may be optional. For example, as will be discussed below, deployment dates and/or dependencies may be used to identify recommended deletions. In some embodiments, recommendations will be identified based on less than the full set of determinations mentioned in process 200. In block 201, the resource tracking application scans a resource storage device or a data repository on a computer for resources. The resource tracking application may scan a single device, multiple devices, a data repository on a computer, multiple data repositories, or any combination thereof. The devices and data repositories may currently be in use or out of use by a client or user. The resources to be scanned may be applications, source code, log files, servers, or any combination of software and/or hardware. In one or more embodiments, the resource tracking application may scan through the source code line by line.

In block 202, the resource tracking application determines the date that the resources were deployed and/or executed. The resource tracking application may scan the log file and/or resource metadata to determine the deployment date and a list of execution dates of the resource. In one or more embodiments, the log file and/or resource metadata includes a time stamp of each action of the resource, including the deployment date, each time the resource was modified, each time the resource was executed, and any other action taken by the resource or any modification to the resource.

In block 204, a subset of resources is identified for potential removal. The subset of resources may be identified based on the deployment date of the resource. The deployment date may identify outdated resources or vulnerable resources. As such, resources deployed prior to a pre-determined date may be considered for removal. The pre-determined date may be decided by a user, an algorithm such as a learning or prediction algorithm, or a default date based on the scanned system. In one or more embodiments, the algorithm may determine the deployment dates for all resources on a server and calculate an average or median deployment date. The average or median deployment date may be used as the pre-determined date. Furthermore, the algorithm may learn information related to the user or client's past resource deletion habits to identify a subset of resources to be recommended for removal based upon common attributes shared with previously removed resources.

In one or more embodiments, the resources may be categorized by topic, application type, and/or other features of the resources. Each categorization may have a personalized criteria for identification of the potential candidate resources for removal/update. For example, certain resources may be categorized as tax application resources. It may be desirable to maintain the tax application resources until replacement of the tax application resources in the following tax season. In contrast, resources associated with a different topic may have a shorter or longer life-span, thus, the candidate identification criteria may differ between these two categories of resources. Further, a first set of candidate criteria may be used to identify candidate resources for deletion, while a second different set of candidate criteria may be used to identify candidate resources for updating.

In one or more embodiments, it may be desirable to identify potential candidate resources for removal/update based at least in part upon a last execution date of the resource 104, as this may indicate whether the resource is currently being used. Accordingly, the subset of resources identified for potential removal may be based on the last execution date of the resource. As discussed above, the subset of resources may be determined by a pre-determined date for the last execution of the resources. The pre-determined date may be decided by a user, an algorithm such as a learning or prediction algorithm, or a default date based on the scanned system. In one or more embodiments, the algorithm may determine the last execution dates for all resources on a server and calculate an average or median last execution date. The average or median last execution date may be used as the pre-determined date. Additionally, the algorithm may learn information related to the user or client's past resource deletion habits to identify a subset of resources to be recommended for removal based upon common attributes shared with previously removed resources.

In block 206, the resource tracking application determines any dependencies related to the candidate resources for removal/update and any unused paths. As mentioned above, the resource tracking application may scan the resources by going line by line through and/or parsing the code to determine if any other resources are referenced by the resources. A dependency tree may be generated, as each of the resources are scanned, providing an indication of the relationship between each of the resources. A reference may be a call-out of a resource being utilized by another resource. The resources may be located on the same server or data repository, or the resources may be located across multiple servers and repositories.

In block 208, a decision is made by the resource application based on the resource being a dependency. If the resource is a dependent of another resource that is not a candidate for removal/update, the resource is left as is, no recommendation is made to the user in regard to the resource, and the process finishes for the particular resource. If the resource is not a dependency, the process 200 moves to block 210. Further, in instances where there is an unused path, the unused path may be recommended for removal.

In block 210, a recommendation is made to a user to delete/update the resource. The recommendation is based upon the resource not being a dependency of another non-candidate resource and the deployment date, the last execution date, or a combination of the two dates. The recommendation may be presented to the user via a user interface or graphical user interface. Additionally, the recommendation may prompt the user to allow the application to delete the resource, and upon receiving an input from the user indicating agreement to delete the resource, the resource tracking application may delete the resource from the resource storage device or data repository.

In some instances, it may be desirable to provide additional cleanup based upon removal of resources. For instance, dependencies of removed resources can also be removed, if no other resources depend on the dependencies. Accordingly, as illustrated in the process 200, an optional block 212 may be initiated after the recommendation is made to the user. Block 212 begins a dependency check and recommendation for the removed resource, as discussed further in FIG. 3.

Figure 3:
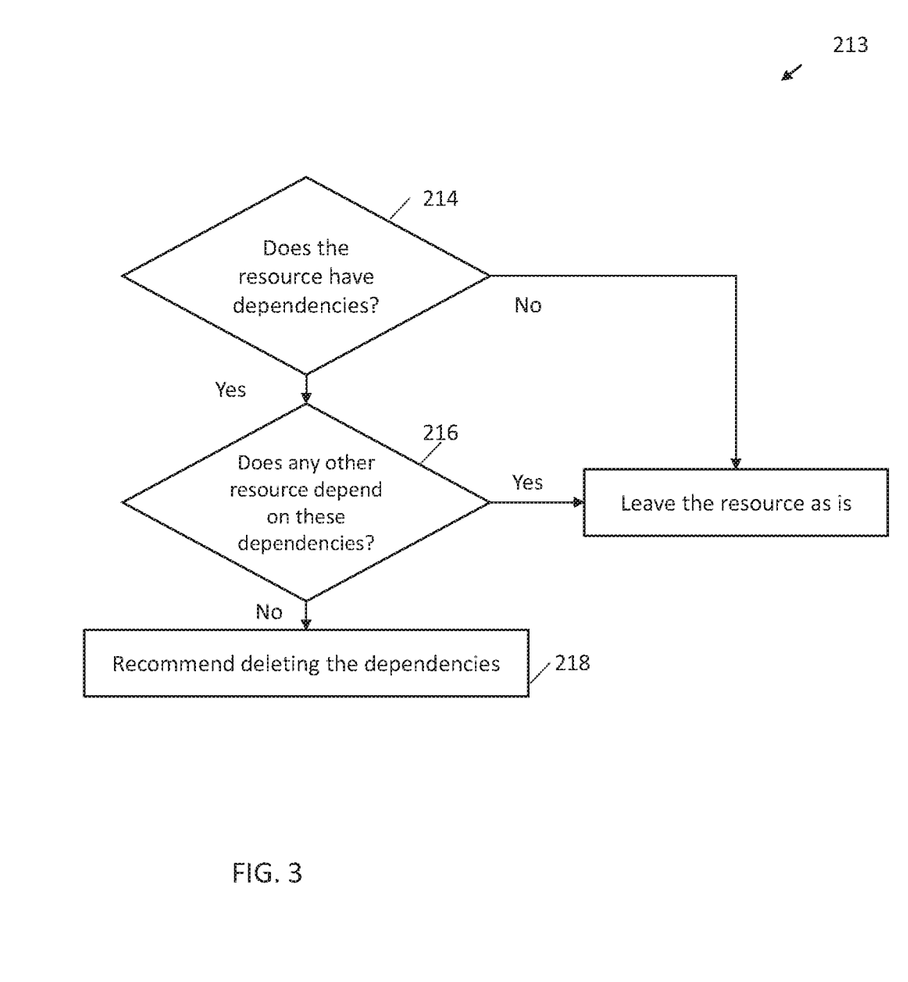
FIG. 3 shows a flowchart for scanning dependencies of a resource, in accordance with aspects of the present disclosure.

FIG. 3 shows a process 213 for checking dependencies of a removed resource as discussed in optional block 212. At decision block 214, a determination is made if the removed resource has a dependency. The dependency check may be an option selected by the user or a pre-determined setting by the resource tracking application. The dependency check may search through lines of source code of the resource to determine if other resources are referenced by the source code. If the resource has no dependencies, the resource is left as is and the process 213 is finished. If the resource has dependencies, the process moves to block 216.

At decision block 216, a determination is made if any other resources depend on the dependencies. The initial scan may reveal that the dependencies of the removed resource may be dependencies for additional resources on the resource storage device. Additionally, a third scan may occur to determine if there are more resources referenced by the dependencies. If the any other resources depend on the dependencies, then the dependencies are left as is and the process 213 is finished. In one or more embodiments, the resource tracking system may map dependencies to a pre-determined level (e.g., up to 10 dependencies of dependencies). The resource tracking system may repeat this process a pre-determined number of times as required by the user. In some embodiments, a record of previously analyzed resources may be maintained, such that previously analyzed resources are not subject to further analysis. If no further resources are dependent on the dependencies, then the process moves to block 218.

At block 218, a recommendation is made to a user to delete the dependencies. The recommendation is based upon no other resources being dependent upon the dependencies. The recommendation may be presented to the user via a user interface or graphical user interface. Additionally, a prompt requesting the user allow the application to delete the dependencies may be provided. Upon the user agreeing to allow the application to delete the resource, the resource tracking application may automatically delete the dependencies from the resource storage device or data repository.

Figure 4:
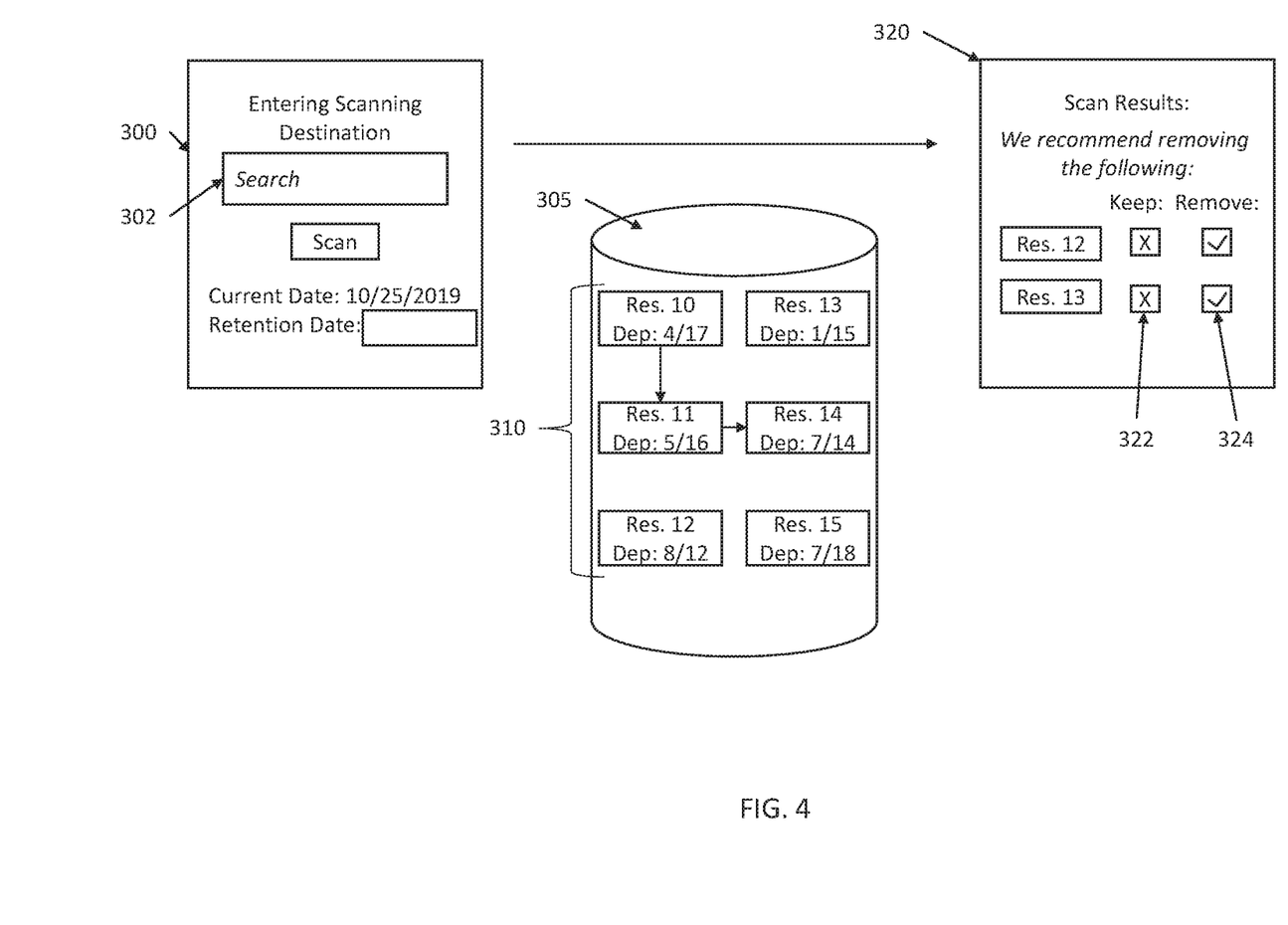
FIG. 4 shows an example of scanning resources by deployment date, in accordance with aspects of the present disclosure.

Turning now to examples of how the current application may facilitate removal of unused resources, FIG. 4 shows an example of deployment date (e.g., Dep.) based recommendations, in accordance with one or more embodiments. The example shows a graphical user interface (GUI) prompt 300 to a user to scan a particular destination. The destination scanned may be a particular drive, folder, or an entire server. After the user enters the destination to scan, the user clicks the "Scan" button 302 to initiate the scan of the server 305. The scan identifies that the resource storage device 305 includes six resources 310: Resource (e.g., Res.) 10 which was deployed on April 2017, Resource 11 which was deployed on May 2015, Resource 12 which was deployed on August 2012, Resource 13 which was deployed on January 2015, Resource 14 which was deployed on July 2014, and Resource 15 which was deployed on July 2018. Furthermore, the scan identifies that Resource 10 depends upon Resource 11, which itself depends upon Resource 14, as indicated by the arrows.

In the current example, the candidate resources for removal/update are based upon a deployment date threshold. After scanning the resources to determine deployment dates, the resource tracking application produces a GUI indication of scan results 320 with a recommendation to remove Resource 12 and Resource 13, as these resources exceed a pre-determined deployment threshold date of January 2016. While the example uses a fixed deployment threshold date, the deployment threshold date may also be a time period, such as 3 years prior to today's date. The recommendation is based upon deployment dates that are earlier than 2016. Since Resource 12 has a deployment date of August 2012 and Resource 13 has a deployment date of January 2015, these resources are recommended for deletion, as they do not meet the deployment threshold criteria. Additionally, Resource 12 and 13 have no dependencies and are not dependents of other resources. While Resource 14 has a deployment date of July 2014, which does not meet the threshold date criteria, the resource tracking application recognized that Resource 14 is a dependency of Resource 11, which has a deployment date of May 2016 and, thus, does meet the threshold date criteria. Thus, neither Resource 14 nor Resource 11 are recommended for removal. The user may select the prompts by clicking "X" 322 to keep the resource or the "check" 324 to remove the resource.

Figure 5:
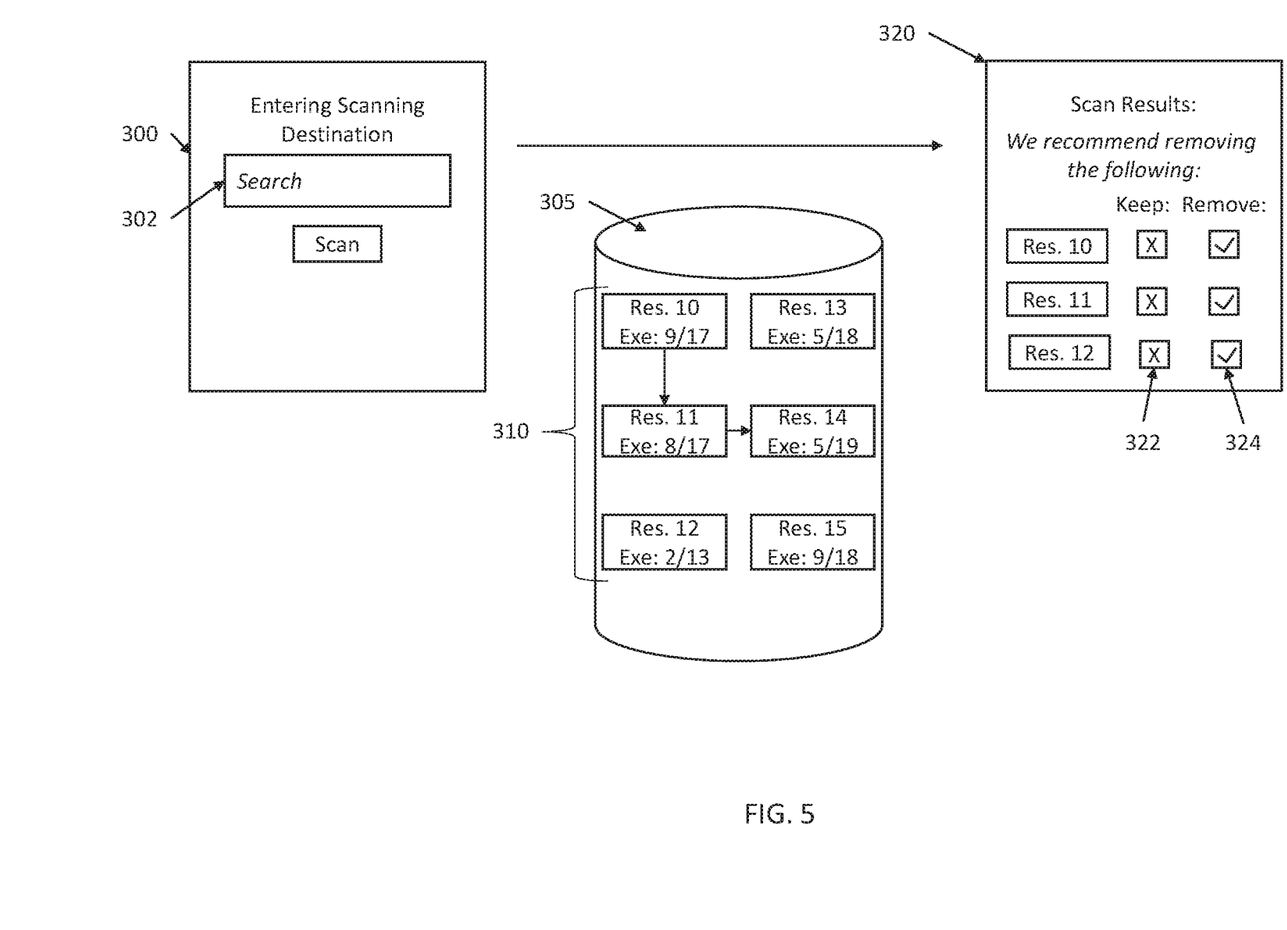
FIG. 5 shows an example of scanning resources by execution date, in accordance with aspects of the present disclosure.

Turning now to another example, as mentioned above, in some instances the last execution date of the resource may be a good indication of candidate resources for removal/update. FIG. 5 shows a second example where execution date (e.g., Exe.) is used to identify candidate resources for removal/update, in accordance with one or more embodiments. The example follows a similar process as FIG. 4, however, the scan searches and accounts for the last executable date of the resources 310, rather than the deployment date of the resources 310. The resource storage device 305 includes six resources 310: Resource 10 which was last executed on September 2017, Resource 11 which was last executed on August 2017, Resource 12 which was last executed on February 2013, Resource 13 which was last executed on May 2018, Resource 14 which was last executed on May 2019, and Resource 15 which was last executed on September 2018. Furthermore, Resource 10 depends upon Resource 11, which itself depends upon Resource 14, as indicated by the arrows. After scanning the resources to determine last executable dates, the resource tracking application produces a GUI indication of scan results 320 with a recommendation to remove Resource 10, Resource 11, and Resource 12, based upon these resources not meeting a last execution date threshold of the year 2018. As may be appreciated, this threshold may be set based upon a reference amount of time (e.g., 1 year before the current year of 2019) and/or based upon an explicit date indicated by the user or algorithm. Here, the recommendation is based upon last executable dates that are earlier than 2018. Since Resource 10 has a last executable date of September 2017, Resource 11 has a last executable date of August 2017, and Resource 12 has a last executable date of February 2013, these resources are recommended for deletion. Additionally, Resource 12 has no dependencies and is not a dependent of other resources. While Resource 14 is a dependency of Resource 11, Resource 14 has a last executable date of May 2019 and was, therefore, not recommended to be removed. The user then may select the prompts by clicking "X" 322 to keep the resource or the "check" 324 to remove the resource. Despite not breaching the last execution date threshold, in some embodiments, when the optional dependency check (e.g., of FIG. 2) is implemented and Resource 11 is removed, Resource 14 may be recommended for removal, as the only resources dependent upon Resource 14 have been removed.

Figure 6:
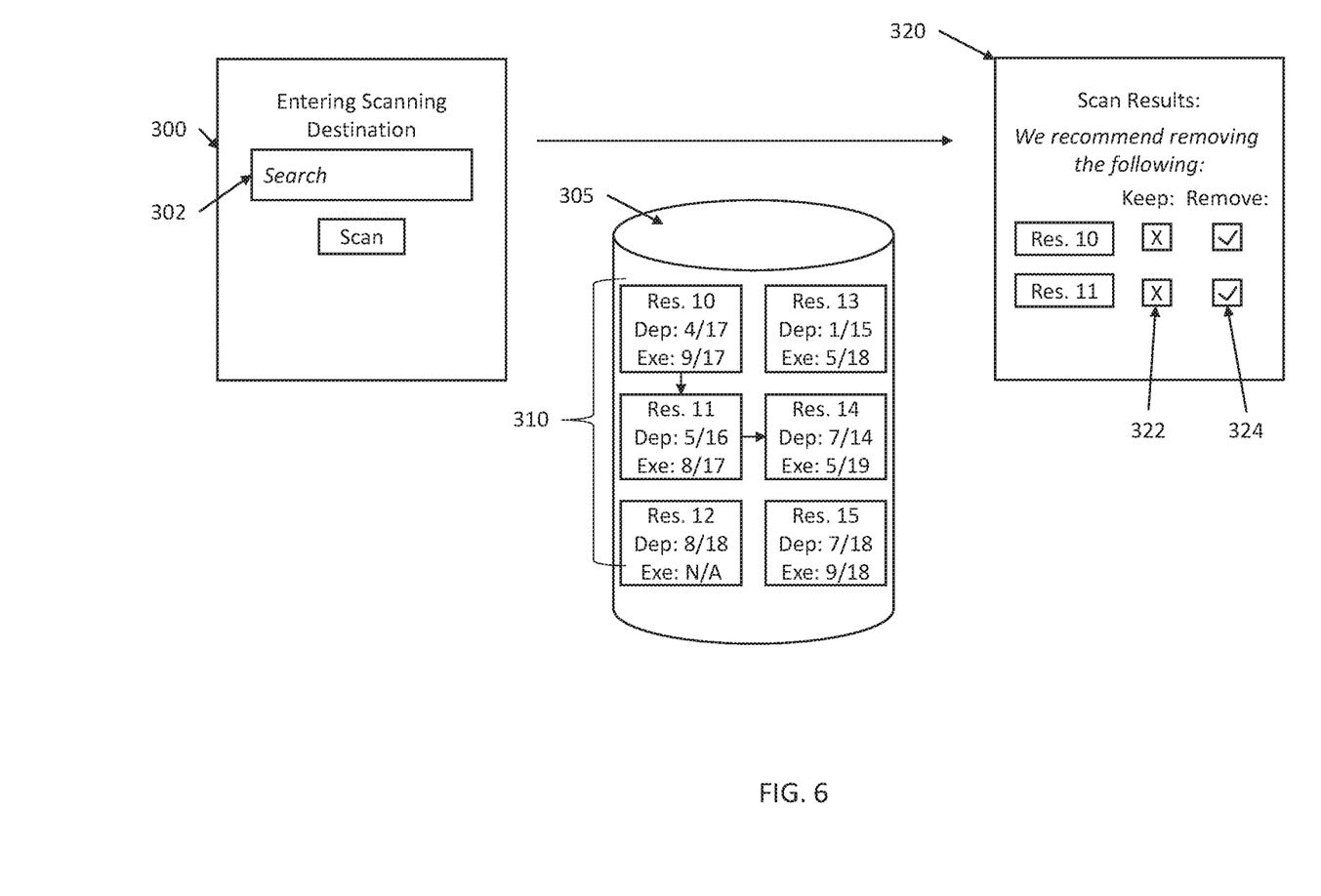
FIG. 6 shows an example of scanning resources by deployment and execution date, in accordance with aspects of the present disclosure.

FIG. 6 shows a third example in accordance with one or more embodiments. The example follows a similar process as FIGS. 4 and 5, however, the scan searches for both the deployment date and the last executable date of the resources 310. The resource storage device 305 includes six resources 310: Resource 10 which was deployed in April 2017 and last executed on September 2017, Resource 11 which was deployed in May 2016 and last executed on August 2017, Resource 12 which was deployed in August 2018 and has never been executed, Resource 13 which was deployed in January 2015 and last executed on May 2018, Resource 14 which was deployed in July 2013 and last executed on May 2019, and Resource 15 which was deployed in July 2018 and last executed on September 2018. Furthermore, Resource 10 depends upon Resource 11, which itself depends upon Resource 14, as indicated by the arrows. After scanning the resources to determine last executable dates, the resource tracking application produces a scan results 320 with a recommendation to remove Resource 10 and Resource 11. The recommendation is based upon last executable dates that are earlier than 2018 and also upon the deployment date being January 2016. Since Resource 10 has a last executable date of September 2017 and Resource 11 has a last executable date of August 2017, these resources to not meet the last executable date threshold of 2018. While Resource 12 has no executable date, thus not meeting the last executable date threshold of 2018, the deployment date does meet the pre-determined date of being deployed after 2016, thus, Resource 12 is not recommended for removal. This combination of deployment date criteria and last execution date criteria may be helpful when dealing with a scenario where a resource has been recently developed and has not yet been executed or incorporated for use by other resources. While Resource 14 is a dependency of Resource 11, Resource 14 has a last executable date of May 2019 and is, therefore, not recommended to be removed. The user may then select the prompts by clicking "X" 322 to keep associated resources or the "check" 324 to remove associated resources.

Exemplary embodiments of methods, systems, and apparatus for use in resource tracking application system are not limited to the specific embodiments described herein, but rather, components of systems and/or steps of the methods may be utilized independently and separately from other components and/or steps described herein. For example, the methods, systems, and apparatus may also be used in combination with other systems, and are not limited to practice with only the systems and methods as described herein. Rather, the exemplary embodiment can be implemented and utilized in connection with many other applications, equipment, and systems that may benefit resource tracking.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A resource tracking system comprising:
   a resource storage device comprising a plurality of resources, wherein at least a subset of the plurality of resources comprise a plurality of lines of source code;
   a resource tracking application configured to:

scan the resource storage device to identify the plurality of resources;

determine a deployment date, an execution date, or both for each resource of the plurality of resources;

identify resource dependencies by scanning the plurality of lines of source code to identify references to other resources;

identify a deletion candidate subset of the plurality of resources that do not meet deployment date criteria, execution date criteria, or both based upon the deployment date, the execution date, or both determined for each resource of the plurality of resources;

identify, from the resource dependencies a portion of resource dependencies that have a deployment date that meets the deployment date criteria;

refrain from including resources associated with the portion of resource dependencies in the deletion candidate subset of the plurality of resources, based upon the deployment date of the portion of resource dependencies meeting the deployment date criteria; and recommend, via a graphical user interface, an action to delete the deletion candidate subset of the plurality of resources.

2. The resource tracking system of claim 1, wherein the graphical user interface comprises:

a list of the subset of the plurality of resources, which are recommended for deletion, wherein the subset of the plurality of resources comprises resources of the plurality of resources that are not referenced as dependencies of other resources of the plurality of resources that are to be retained, and wherein the list comprises a graphical indication of a connection between the subset of the plurality of resources and the resource dependencies; and a selectable prompt that, when selected, indicates a request for the resource tracking application to delete the subset of the plurality of resources.

3. The resource tracking system of claim 1, wherein the action prompts the user to update the resource from the subset of the plurality of resources.

4. A tangible, non-transitory, computer-readable medium, comprising computer-readable instructions that, when executed by one or more processors of a computer, cause the computer to:

scan a resource storage device to identify a plurality of resources stored in the resource storage device, wherein at least a subset of the plurality of resources comprise a plurality of lines of source code;

determine a deployment date, an execution date, or both for each resource of the plurality of resources;

identify resource dependencies by scanning the plurality of lines of source code to identify references to other resources;

identify a deletion candidate subset of the plurality of resources that do not meet deployment date criteria, execution date criteria, or both based upon the deployment date, the execution date, or both determined for each resource of the plurality of resources;

identify, from the resource dependencies a portion of resource dependencies that have a deployment date that meets the deployment date criteria;

refrain from including resources associated with the portion of resource dependencies in the deletion candidate subset of the plurality of resources, based upon the deployment date of the portion of resource dependencies meeting the deployment date criteria; and recommend, via a graphical user interface, an action to delete the deletion candidate subset of the plurality of resources.

5. The computer-readable medium of claim 4, wherein the graphical user interface comprises:

a list of the subset of the plurality of resources, which are recommended for deletion, wherein the subset of the plurality of resources comprises resources of the plurality of resources that are not referenced as dependencies of other resources of the plurality of resources that are to be retained, and wherein the list comprises a graphical indication of a connection between the subset of the plurality of resources and the resource dependencies; and a selectable prompt that, when selected, indicates a request for the computer to delete the subset of the plurality of resources.

6. The computer-readable medium of claim 4, wherein the action prompts the user to update the resource from the subset of the plurality of resources.

7. A computer-implemented method, comprising:

scanning a resource storage device to identify a plurality of resources stored in the resource storage device, wherein at least a subset of the plurality of resources comprise a plurality of lines of source code;

determining a deployment date, an execution date, or both for each resource of the plurality of resources;

identifying resource dependencies by scanning the plurality of lines of source code to identify references to other resources;

identifying a deletion candidate subset of the plurality of resources that do not meet deployment date criteria, execution date criteria, or both based upon the deployment date, the execution date, or both determined for each resource of the plurality of resources;

identifying, from the resource dependencies a portion of resource dependencies that have a deployment date that meets the deployment date criteria;

refraining from including resources associated with the portion of resource dependencies in the deletion candidate subset of the plurality of resources, based upon the deployment date of the portion of resource dependencies meeting the deployment date criteria; and recommending, via a graphical user interface, an action to delete the subset of the plurality of resources.

8. The computer-implemented method of claim 7, wherein the graphical user interface comprises:

a list of the subset of the plurality of resources, which are recommended for deletion, wherein the subset of the plurality of resources comprises resources of the plurality of resources that are not referenced as dependencies of other resources of the plurality of resources that are to be retained, and wherein the list comprises a graphical indication of a connection between the subset of the plurality of resources and the resource dependencies; and a selectable prompt that, when selected, indicates a request for the resource tracking application to delete the subset of the plurality of resources.

9. The computer-implemented method of claim 7, wherein the action prompts the user to update the resource from the subset of the plurality of resources.

* * * * *

UNITED STATES PATENT AND TRADEMARK OFFICE
CERTIFICATE OF CORRECTION

PATENT NO. : 11,526,349 B1  
APPLICATION NO. : 17/082978  
DATED : December 13, 2022  
INVENTOR(S) : Ryan Thomas Russell et al.

Page 1 of 1

It is certified that error appears in the above-identified patent and that said Letters Patent is hereby corrected as shown below:

In the Specification

Column 5, Line 5, delete "(STEM)" and insert -- (SIEM) --, therefor.

Column 8, Line 15, delete "the any" and insert -- any --, therefor.

Column 8, Line 45, delete "server 305" and insert -- resource storage device 305 --, therefor.

Column 10, Line 16, delete "to" and insert -- do --, therefor.

In the Claims

Column 12, Line 47, Claim 7, delete "the" and insert -- the deletion candidate --, therefor.

Signed and Sealed this  
Sixth Day of February, 2024

Katherine Kelly Vidal  
*Director of the United States Patent and Trademark Office*